United States Patent [19]
Vreeland et al.

[11] Patent Number: 5,520,727
[45] Date of Patent: May 28, 1996

[54] AQUEOUS ALGAL-BASED PHENOLIC TYPE ADHESIVES AND GLUES

[75] Inventors: Valerie Vreeland, Berkeley; Eva Grotkopp, San Francisco, both of Calif.

[73] Assignee: The Regents of University of California, Oakland, Calif.

[21] Appl. No.: 108,077

[22] Filed: Aug. 16, 1993

[51] Int. Cl.$^6$ .......................... C09J 199/00; C09J 105/04
[52] U.S. Cl. .......................... 106/205; 435/156; 527/100; 528/219
[58] Field of Search .......................... 106/205; 435/156; 527/100; 528/219

[56] References Cited

U.S. PATENT DOCUMENTS

| | | | |
|---|---|---|---|
| 2,798,079 | 7/1957 | Linn | 260/345.7 |
| 2,798,098 | 7/1957 | Linn | 260/618 |
| 2,806,007 | 9/1957 | Linn | 260/17.2 |
| 4,808,702 | 2/1989 | Waite | 530/328 |
| 4,900,671 | 2/1990 | Pokora | 435/156 |
| 5,112,752 | 5/1992 | Johnson | 435/192 |

*Primary Examiner*—David Brunsman
*Attorney, Agent, or Firm*—Hana Verny

[57] ABSTRACT

A novel water-resistant, aqueous, and versatile phenolic adhesive or glue derived from algal materials. Phenolic compounds act as an adhesive glue by binding non-specifically to both hydrophobic and hydrophilic surfaces in aqueous conditions and are useful for medical, biological, biomedical, marine, industrial and other applications. Algal derived adhesive phenolic compounds are activated with enzyme catalyst or oxidizing agents and/or cross-linked with algal carbohydrate, other fibers, or proteins.

20 Claims, 11 Drawing Sheets

AQUEOUS ALGAL-BASED PHENOLIC TYPE ADHESIVES AND GLUES

The present invention was made in the course of research supported by the research grant DCB 8905221, from the National Science Foundation, and by the research grant USDA 92-37304-7864 from the United States Department of Agriculture. The United States Government may have certain rights in this invention.

BACKGROUND OF THE INVENTION

1. Field of Invention

This invention concerns novel water-resistant, and versatile phenolic adhesive products and glue derived from algal materials. In particular, the phenolic compounds of this invention act as adhesives by binding non-specifically to both hydrophobic and hydrophilic surfaces under water and are thus useful for medical, biological, biomedical, marine, industrial and other applications. The invention further relates to algal-derived glues and adhesive products containing activated phenolic component. The activation may be achieved with algal peroxidase catalysts. The activated phenolic may be cross-linked with algal carbohydrates and other fibers.

2. Background Art and Related Disclosures

The ability of various aquatic and marine organisms such as mussels, barnacles, oysters or algae to adhere to various surfaces under water is well known.

For many years, attempts were made to identify the mechanism by which these organisms achieve such strong adhesive bonding, to determine whether the same or similar mechanism could be used to produce a water-resistant adhesive. Typically, these attempts led to formation of adhesives of various strengths. Many of the adhesives would bind either to hydrophobic or hydrophilic surfaces, but not both.

For example, *J. Microbiol.*, 12:139 (1990) describes marine adhesive proteins consisting of fibers such as, collagen, fibroin, or chitin, fillers such as sand, shells, air or water and catalyst molecules that are dispersed in cross-linked resin. The marine adhesive resins are typically proteins containing high levels of DOPA.

Phenolic resin adhesives that are the product of an oxidative reaction occurring in the presence of peroxidase or oxidase catalyst are generally disclosed in U.S. Pat. Nos. 4,900,671 and 5,112,752. Suitable oxidative catalysts used in production of these resins are horseradish peroxidase and peroxidase from soybeans, legumes and higher plants. The resin adhesives described are not cross-linked for enhanced adhesive strength nor do they possess both hydrophilic and hydrophobic properties for broad adhesive application.

Phenolic compounds activated with peroxidase enzymes are also disclosed in U.S. Pat. No. 5,030,538 for use as developer layers in transparencies for overhead projection. Phenolic compounds having hot melt adhesive characteristics are disclosed as particular developer layer embodiments.

Abstract P20B, entitled "Non-gelling Wall Interactions of Alginate in Fucus Zygotes Correlate With Adhesion" presented in June 1990 at American Society for Cell Biology Summer Conference at Airlie, Va. discloses the formation of alginate-Fucan and alginate-phenolic interactions in brown alga Fucus zygotes.

None of the above disclosures provide adhesive glue that (i) forms quickly and easily in aqueous conditions without the use of expensive reagents and complicated procedures and (ii) possesses the ability to bind to both hydrophobic and hydrophilic surfaces, and (iii) is water-resistant and environmentally safe.

It would, therefore, be advantageous to provide adhesives which are able to bind with great strength to both hydrophobic and hydrophilic surfaces under water, are water-resistant and otherwise generally inexpensive and versatile.

It is, therefore, a primary object of the present invention to provide a stable aqueous adhesive comprising phenolic containing products derived from naturally occurring brown algae (Phaeophytes), red algae (Rhodophytes), and related algae that are safe, water-resistant, capable of binding, with great strength, to both hydrophobic and hydrophilic surfaces of materials, resistant to destruction by various agents that destroy previously known protein containing adhesives, and readily formed in aqueous conditions from dry product without resort to complex reactions and procedures.

It is a further object of the present invention to prepare adhesive phenolic products that are substantially cross-linked for greater adhesive strength and additionally have both hydrophilic and hydrophobic properties to broaden their suitability for adhesive applications.

It is yet a further object of the invention to prepare an adhesive that consists essentially of naturally occurring algal phenolic compounds.

It is yet a further object of the invention to prepare adhesive phenolic products that comprise naturally occurring algal phenolic compounds that are activated with an oxidizing agent in the presence of a naturally occurring algal peroxidase enzyme and/or are covalently cross-linked with algal carbohydrate or other fibers.

SUMMARY

One aspect of the current invention is an algal phenolic containing formulation that is water-resistant, safe and versatile in aqueous conditions to bind to both hydrophobic and hydrophilic surfaces.

Another aspect of the current invention is a fiber and phenolic containing formulation produced by cross-linking of a fiber with phenolic under water in the presence of a vanadate-requiring haloperoxidase.

Still another aspect of the current invention is the process for production of the water-resistant adhesive comprising of fiber and phenolic derived from algae.

Still yet another aspect of the current invention is a water-resistant, safe and versatile adhesive derived from algal materials wherein the adhesive is made of cross-linked algal phenolic compound with algal carbohydrate.

Still yet another aspect of the current invention is an adhesive formulation consisting essentially of an algal comprising phenolic in dry form able to form a strong adhesion with both hydrophobic and hydrophilic surfaces.

DETAILED DESCRIPTION OF THE INVENTION

Figure 1:
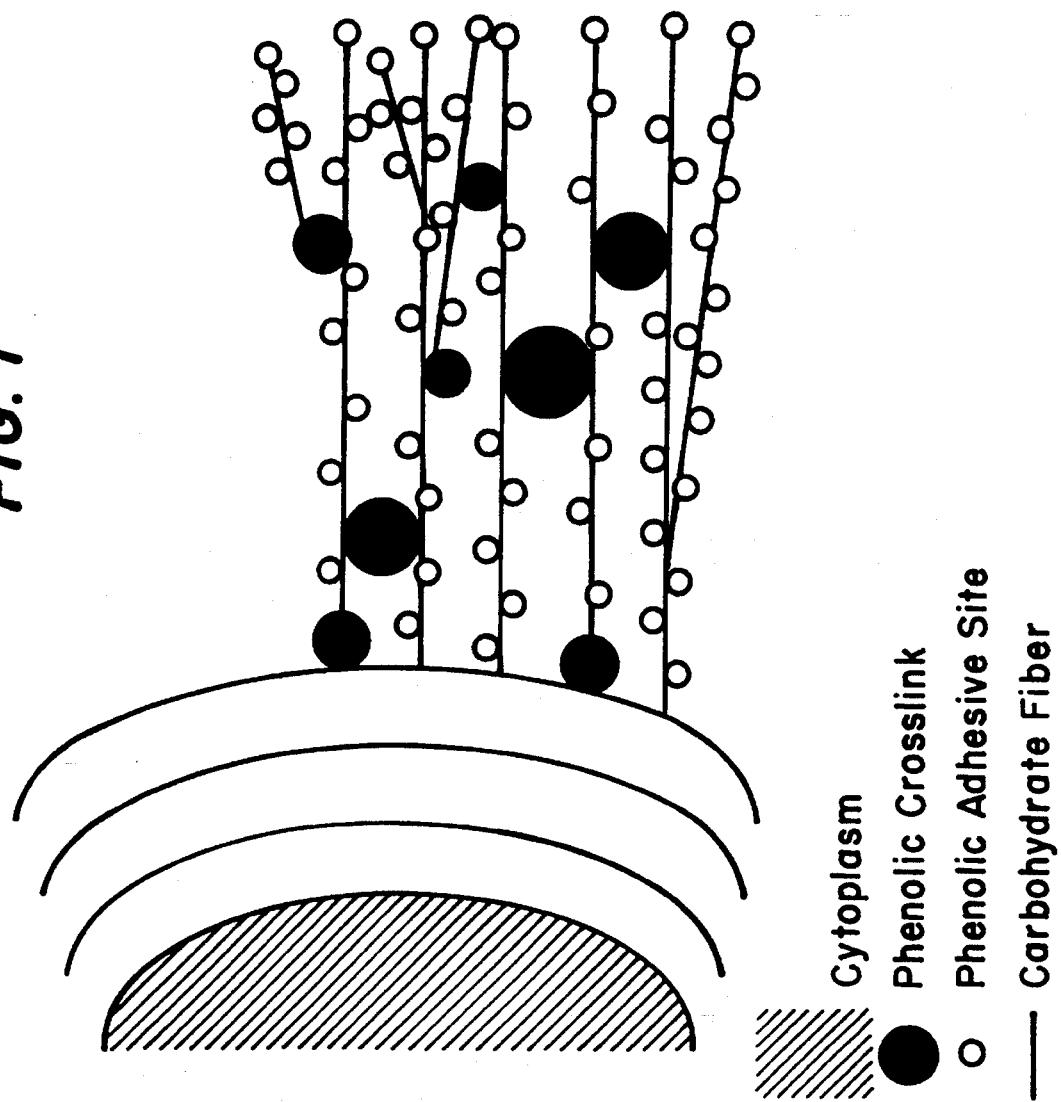
FIG. 1 depicts a working model of fiber phenolic adhesive interactions.

The current invention concerns novel aqueous adhesive products and glues derived from algal materials. Resulting algal adhesives emulate the adhesive properties of the natural algae in water. The products possess strong adhesive properties as well as an ability to bind to both hydrophobic and hydrophilic surfaces. That ability is particularly useful for adhesive applications requiring strong bonds between different materials.

In accordance with the present invention, naturally occurring phenolic compounds derived from algal materials are utilized in an adhesive or glue that binds to both hydrophobic and hydrophilic surfaces. The phenolic compounds optionally may be activated with an oxidizing agent chosen from the typical chemical oxidation agents such as hydrogen peroxide or sodium hypochlorite alone, or in the presence of a peroxidase enzyme catalyst derived from brown, red and related algae. The adhesives may also comprise algal derived phenolic compounds that are covalently cross-linked with algal carbohydrates or other fibers. The use of peroxidase enzymes and/or algal carbohydrates or fibers in the formation of the phenolic adhesive is desirable for particular adhesive applications. For other adhesive applications, the activated algal derived phenolic compound, alone, exhibits the requisite adhesive properties.

The new adhesive is formed utilizing one to three components, namely a phenolic, a fiber and a catalyst. The catalyst, when utilized, catalyzes activation of algal phenolic compounds. The activated phenolic compounds establish phenolic cross-links between algal carbohydrate or other fibers by forming phenolic-fiber bonds. However, under certain circumstances, the activated phenolic compounds of the present invention forms phenolic-phenolic bonds in the absence of algal fibers. Thus, alternatively, the adhesive of the current invention may be produced by sole extraction of phenolic from the brown algae with methyl alcohol without presence of any oxidizing catalyst or algal carbohydrate or fiber.

All components utilized in the current invention are seaweed products. The phenolic compound is produced by brown algae, red algae and related algae. The vanadate-requiring bromoperoxidase is a stable enzyme occurring naturally in brown algae, in some red algae and in some other naturally-occurring sources. The algal carbohydrate component, i.e., alginates and fucoidans are readily extracted from the cell walls of brown algae.

Phenolic Adhesive Components

The basic premise of the current invention is the formation of adhesive or glue from the activated phenolic compounds that are extracted from brown, red or related algae and then oxidized with a suitable oxidation agent.

The phenolic is activated either by extraction with a lower alcohol, preferably methanol, or by addition of the enzyme catalyst, such as vanadate-requiring peroxidase or horse radish peroxidase, or by addition of oxidizing agent, such as sodium hypochlorite, hydrogen peroxide, urea hydrogen peroxide and others.

The phenolic component of the adhesives of the current invention is algal phloroglucinol-based phenolic compounds. These phloroglucinol-based polyphenols are called phlorotannins. Phloroglucinol units are joined by carbon-carbon bonds or by ether linkages in these polydisperse polyphenols.

Phloroglucinol present in phenolic compounds of brown algae has a formula:

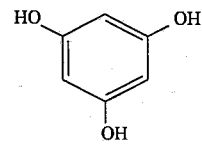

Phloroglucinol units are linked with carbon-carbon or ether bonds to form polyphenol as shown below

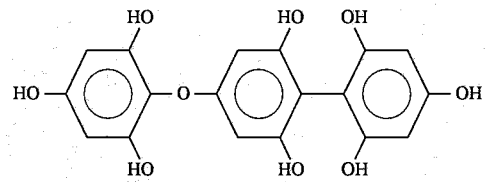

having between 2–500,000, preferably between 4–7 phloroglucinol units.

Phlorotannins are produced in quantity by brown algae. Some red algae and other algae also produce phenolic compounds. Phlorotannins are easily oxidized into highly reactive form by commonly known oxidizing agents or by vanadate peroxidase catalyst or other enzymes and oxidants. The activated Phlorotannun can then condense onto biopolymers. Phlorotannins are readily extracted from brown seaweeds, and are relatively stable when dried.

The use of phlorotannins as adhesive sites and cross-linking agents in adhesives of the current invention is based on a current discovery of the functions for phlorotannins in seaweed embryo adhesion and particularly on the discovery of their co-localization with formation of embryonal adhesion. It is further based on the discovery that the addition of vanadate peroxidase or horseradish peroxidase to the embryo increased adhesiveness.

Brown algae are known to produce highly reactive polyphenolic compounds having phloroglucinol units linked by carbon-carbon bonds and by ether bonds. As described in *Prog. Phycol. Res.*, 4: Chapter 4 (1986), young Fucus plants contain about 7–9% phenolic compounds on a dry weight basis. Fucus accumulates polyphenols consisting of 4–7 phloroglucinol units, primarily ether linked with a maximum of three phenyl units per oligomer, and about 25% are branched with a degree of polymerization of greater than 100 units [*Can. J. Chem.*, 63: 304 (1985)]. These phenolic compounds are known substrates for peroxidase.

A role for phloroglucinol-based phenolic compounds in embryo adhesion was determined by use of the Brentamine reagent (Fast Red GG), which is specific for phenolic compounds and is used in quantitation of phenolic compounds. Tetrazotized o-dianisedine (Fast Blue B Salt) stains only the activated form of secreted embryo phenolic compounds.

Typically, phenolic compounds are obtained by drying the brown algae in an air current for about 1 to 2 days. The dry material is cut, chopped, ground or otherwise broken into small particles of about 0.5–5 mm, preferably about 2–4 mm, and the particles are extracted with lower alcohols, preferably methanol, and preferably under constant stirring at room temperature for 15–180 minutes, depending on the quantity of the dry algae to be extracted.

The methyl alcohol extract is then removed from the extraction mixture and filtered to remove any remaining particles. The extract is then evaporated to dryness by using any commercially suitable evaporator at room temperature, preferably using the air current. The dried polyphenols are dissolved in glass-distilled water resulting in a yellow solution. The yellow solution is centrifuged for 1–20 minutes or until it clarifies, and stored at preferably −80° C. The concentration of phenolic compounds in the aqueous solution will vary with the quantities of dried algae and water used. For some applications, the polyphenol extract should be dialyzed to remove salt.

Oxidation Components, Agents and Catalysts

The formation of adhesive according to this invention is partially dependent on the degree of enzymatic activation or chemical oxidation of phenolic compound. To obtain the polyphenol adhesive having desirable adhesive properties, the polyphenol must be oxidized or enzymatically activated to an oxidized or free radical form. Any agent which has at least minimal oxidative activity such as sodium hypochlorite can be successfully utilized in practicing this invention. The vanadate-requiring peroxidase or higher plant peroxidases are preferred enzymes. Free radical forming agents can also be used.

Vanadate Peroxidase Oxidation Enzymes

Vanadate-requiring peroxidase which belongs to the group of haloperoxidases is known to be present in brown algae. Particularly, a very stable vanadate-requiring bromoperoxidase is widespread among the brown algae. This family of peroxidases represents the first known vanadium enzyme. However, the biological function of these vanadate-requiring peroxidases was, until now, not known. Brown algal haloperoxidases were first identified in 1983 in *Bot. Mar.*, 26:429 (1983). A vanadate requirement for a brown algal bromoperoxidase activity was described in *Phytochem.*, 23:1387 (1984). For maximal oxidation activity, a ratio of vanadate:peroxidase of 1:1 has been preferred.

Vanadate requiring haloperoxidases that are suitable for use in the present invention are bromo and iodo peroxidases, bromoperoxidase being the most preferred. Vanadate-requiring bromoperoxidase from *Corallina officinalis* is commercially available from Sigma Chemical Co.(St. Louis, Miss.) as bromoperoxidase. Other vanadate-requiring peroxidases are obtained from Fucus, Ascophyllum and Macrocystis and other brown and red algae according to procedures described in the following publications: *Phytochem.*, 23:1387 (1984); *Phytochem.*, 29:7974 (1990); *Biochem. Biophys. Acta*, 1073:98 (1991); *Environ. Sci. Technol.*, 25:446 (1991); *Biochem. Biophys. Acta* 830:181 (1985); *Biochem. Biophys. Acta*, 912:287 (1987); *Biochem. Biophys. Acta*, 998:63 (1989); *Biochem. Biophys. Res. Comm.*, 160:87 (1989); *Biochem. Biophys. Res. Comm.*, 131:428 (1985); *Agric. Biol. Chem.*, 49:2961 (1985). Peroxidase substrates include hydrogen peroxide, urea hydrogen peroxide and other peroxides including m-chloroperoxybenzoic acid, p-nitro peroxybenzoic acid and pheynylperacetic acid.

Other Peroxidases

Other peroxidases, such as higher plant peroxidases including horseradish peroxidase, or mushroom polyphenoloxidase and other oxidoreductase, commercially available from Sigma are also suitable activation agents advantageously employed in practicing this invention.

Other Oxidation Agents

Other conventional oxidizing agents, such as sodium hypochlorite, periodic acid, nitric acid, potassium permanganate, potassium dichromate, or some such others are equally suitable for practicing this invention. Also suitable agents are organic peroxides, free radical forming agents and orthovanadate. These agents are generally commercially available from Sigma, Aldrich or other chemical companies.

Natural and Synthetic macromolecules

Algal Carbohydrates—Alginates and Fucoidans

In one aspect, the invention incorporates various natural or synthetic macromolecules such as carbohydrates, proteins, fibers which can be cross-linked by the phenolic compounds in the new adhesive. These carbohydrates are typically either alginate or fucoidans, however, it is to be understood that other carbohydrates, proteins and macromolecules may be used as substitutes for algal carbohydrates.

Alginate and fucan, the algal cell wall fibers extracted from brown algae, covalently cross-link with the activated algal derived phenolic compound in the presence of the vanadate-requiring haloperoxidase to form an adhesive glue of this invention. The algal carbohydrates are inexpensive and readily available. Alginate has been used previously in surgical dressings and dental molds.

The source of alginate for the present invention, alginic acid is commercially available from Sigma Chemical Co. as alginic acid from *Macrocystis pyrifera*. It is to be understood, that all other alginate, fucoidans algal fibers and proteins are considered to be within the scope of the current invention and may be substituted for the alginate or fucoidans specifically identified herein.

Process for Preparation of Adhesive Glue

The current invention concerns a preparation of the algal adhesives which possess extremely valuable properties. Since the adhesive is derived from natural materials, it simulates the water-resistant and adhesive properties of algal embryos that bind to various surfaces under water. Consequently, the resulting glue is advantageously used for medical, biomedical, biological, marine or other purposes. The resulting glue is very versatile in its use as it allows binding, at the same time to both hydrophobic and hydrophilic surfaces. In this aspect, it can be advantageously utilized as a connector between two materials having different properties, which materials were previously not possible to glue together.

In practice, the algal phenolic extracted from the brown, red or other related algae is dried and then prepared for actual use as the adhesive or glue. The glue or adhesive may be stored as a premixed powder, paste, liquid or solution, or it may be prepared instantaneously before the intended use by mixing the appropriate components, as illustrated in the examples, in appropriate ratios and amounts, with water or other aqueous solvent, forming a paste in situ of intended use. The phenolic is stored in non-activated form. It is activated in the presence of either lower alcohol or water or other solvents, preferably with an enzyme, oxidation agent or free radical agent. The glue is prepared by mixing the dry phenolic with any of the above agent in amount from 0.1–100 mg of phenolic/1 g of glue with 1–10 ml of a solvent. When the nezyme is used, the phenolic in amount 0.1–100 mg with 1 pg to 100 micrograms of vanadate-requiring haloperoxidase. Alternatively, the macromolecules are added in amount from 0.001–1 g/1 g of glue. The oxidation agent is added in amount 0.01–10%.

It has now been discovered that by chemically and/or enzymatically oxidizing naturally occurring algal phenolic materials, the adhesive properties of the phenols can be increased or manipulated to achieved desirable adhesive properties. In particular, it has been discovered that vanadate-requiring haloperoxidase catalyzes activation of algal phenolic compounds and provides enhanced binding with other algal components. The activated phenolic compounds cross-link with algal carbohydrates, other fibers or with phenolic compounds and other substances. Specifically, a vanadate-requiring haloperoxidase catalyzes crosslinking of soluble alginate and fucan fibers onto the wall surface by phloroglucinol-based phenolic compounds. The cross-linked network contains multiple adhesive sites on the phenolic compounds.

The nature of the adhesive aggregates varies with specific components included, as well as with concentration of the components and their ratios or proportions. For example, high proportions of haloperoxidase to polyphenols produce compact adhesive masses, while slightly lower ratios produce filamentous-type adhesive masses. The proportions, concentrations and identity and proportions of components may be varied to achieve desired adhesive characteristics.

The invention is illustrated in FIGS. 1–11 and in examples where the different properties of various adhesives are obtained as a result of changes in the identity of components used.

FIG. 1 represents a schematic illustration of the fiber-phenolic model of adhesive interaction. As seen in FIG. 1, the algal wall contains the soluble carbohydrate fibers that are secreted from the cell and are incorporated into the adhesive mucilage where they cross-link with an activated phenolic component having at least two adhesive sites. The adhesive sites are responsible for imparting desired adhesive properties in the glue.

Figure 2:
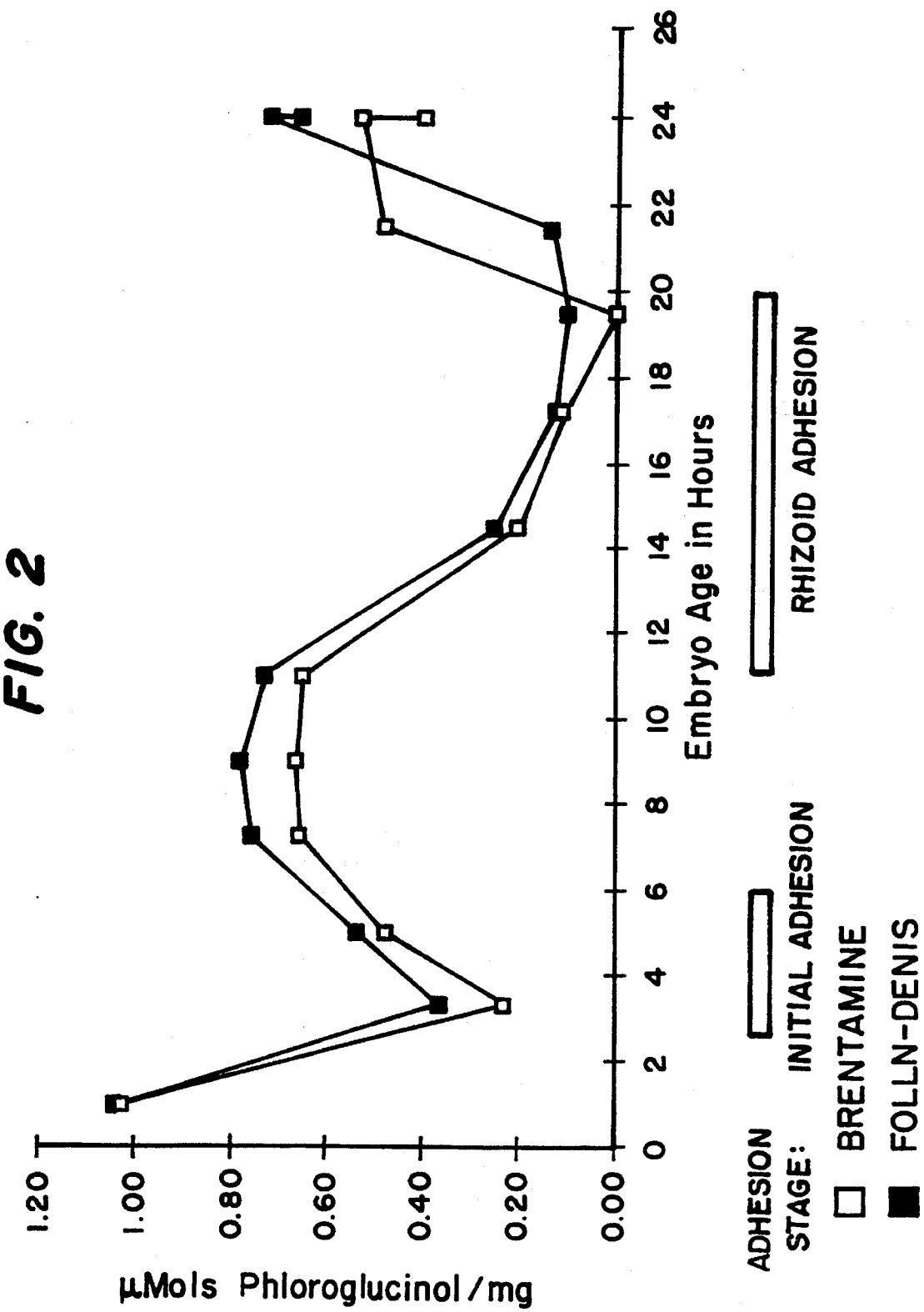
FIG. 2 depicts changes in methanol soluble phenolic levels in Fucus embryos.

FIG. 2 illustrates one aspect of the current invention where the algal phenolic is extracted from Fucus embryo. As seen from FIG. 2, Fucus embryo (zygote) produces high amounts of polyphenols immediately prior to the two adhesion stages, namely the initial adhesion which occurs 3–4 hours after fertilization and the subsequent rhizoid adhesion which occurs around 11–12 hours after fertilization.

Figure 3:
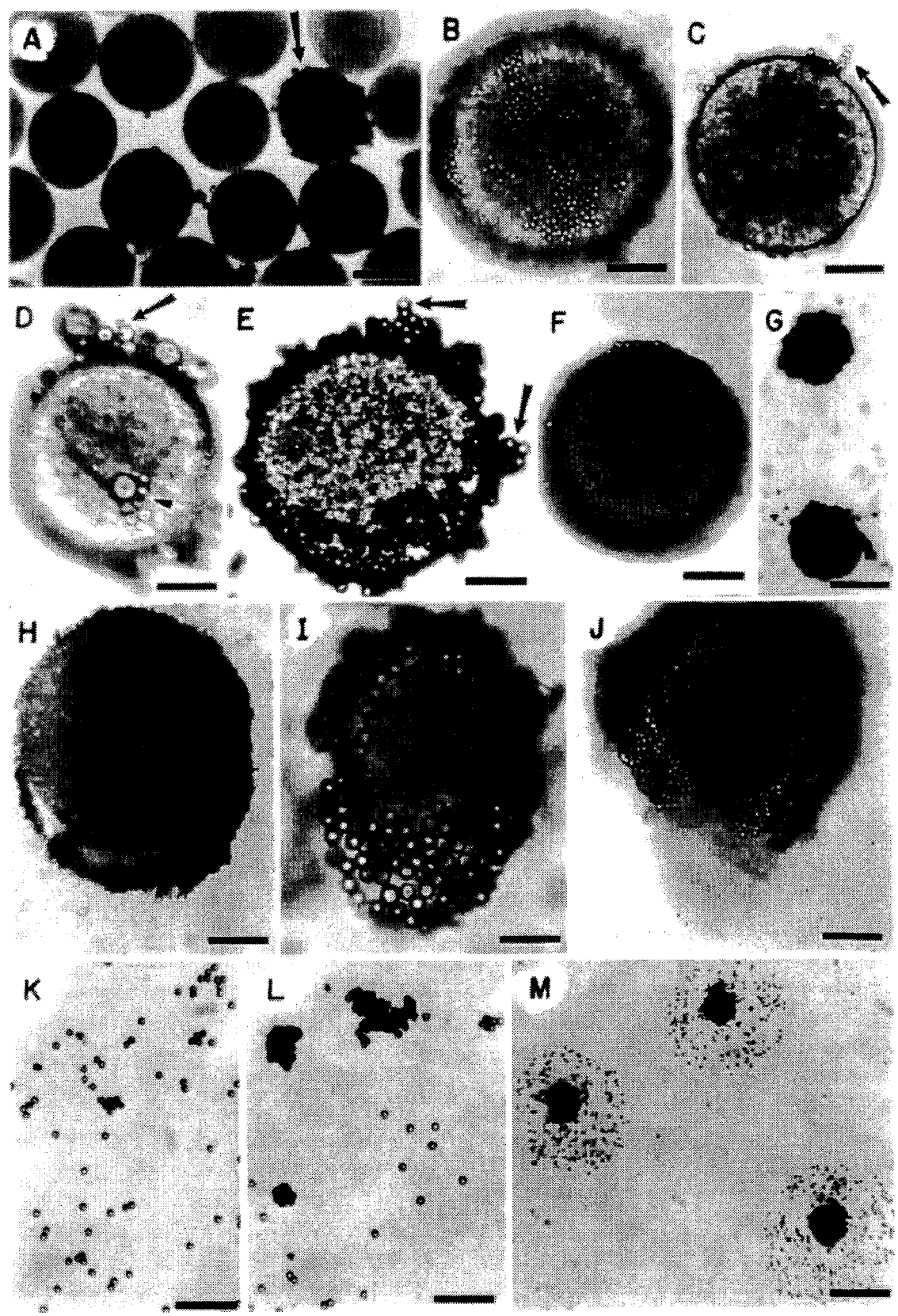
FIG. 3, sections A–M, illustrates production of adhesive by individual zygotes.

FIG. 3 illustrates the adhesivity of zygotes at various stages as determined by monodisperse microspheres used to localize adhesive material on zygote surfaces by method described in Example 1. FIG. 3, A–B shows the increased adherence of microspheres to zygote after 3–4 hours. Zygotes adhered to teflon or paraffin surfaces as well as to glass or polystyrene surfaces and microspheres. There was firm binding to both hydrophobic and hydrophilic materials demonstrating the highly nonspecific nature of the Fucus adhesive. No microspheres adhered to the majority of zygotes prior to the 3 hour period following fertilization. Microspheres adhered to an increasing number of zygotes 3–6 hours old. During this period, clumping of suspended zygotes gradually increased and an increasing number of zygotes adhered to the substrate. Microsphreres bound to all zygotes 8–9 hours old. These results show that detection of microsphere aggregates corresponds to the production of surface adhesive produced by Fucus zygotes.

FIG. 3, C shows mid-zygote focus showing adhesive strand (arrow) on a 4 h zygote, amino-modified polystyrene microspheres 2.47 µm in diameter. The scale bar is 20 µm.

FIG. 3, D shows hollow glass beads 2–20 µm in diameter on an 8.5 h zygote. There is an adhesive patch (arrowhead) and strand (arrow). The scale bar is 20 µm.

FIG. 3, E shows blue polystyrene microspheres 5.000 µm in diameter on a 5 h zygote. There are adhesive aggregates (arrows) and an adhesive-free hemisphere. The scale bar is 24 µm.

FIG. 3, F shows amino-modified polystyrene microspheres 2.47 µm covering the visible surface of a 4.5 h zygote which was labeled in suspension. The scale bar is 20 µm.

FIG. 3, G shows top view of blue polystyrene microspheres 5.000 µm in diameter on 3.5 h zygotes adhered to a glass slide. There is reduced labeling density on the top of the zygotes. The scale bar is 75 µm.

FIG. 3, H shows blue carboxylate-modified polystyrene microspheres 0.413 µm in diameter bound to a 11 h zygote. There is thickened adhesive mucilage at the presumptive germination site (bottom). The scale bar is 20µ.

FIG. 3, I shows blue polystyrene microspheres 5000 µm in diameter cover 15 h zygote. There is thickened adhesive mucilage surrounding the rhizoid (bottom). The scale bar is 20 µm.

Figure 9:
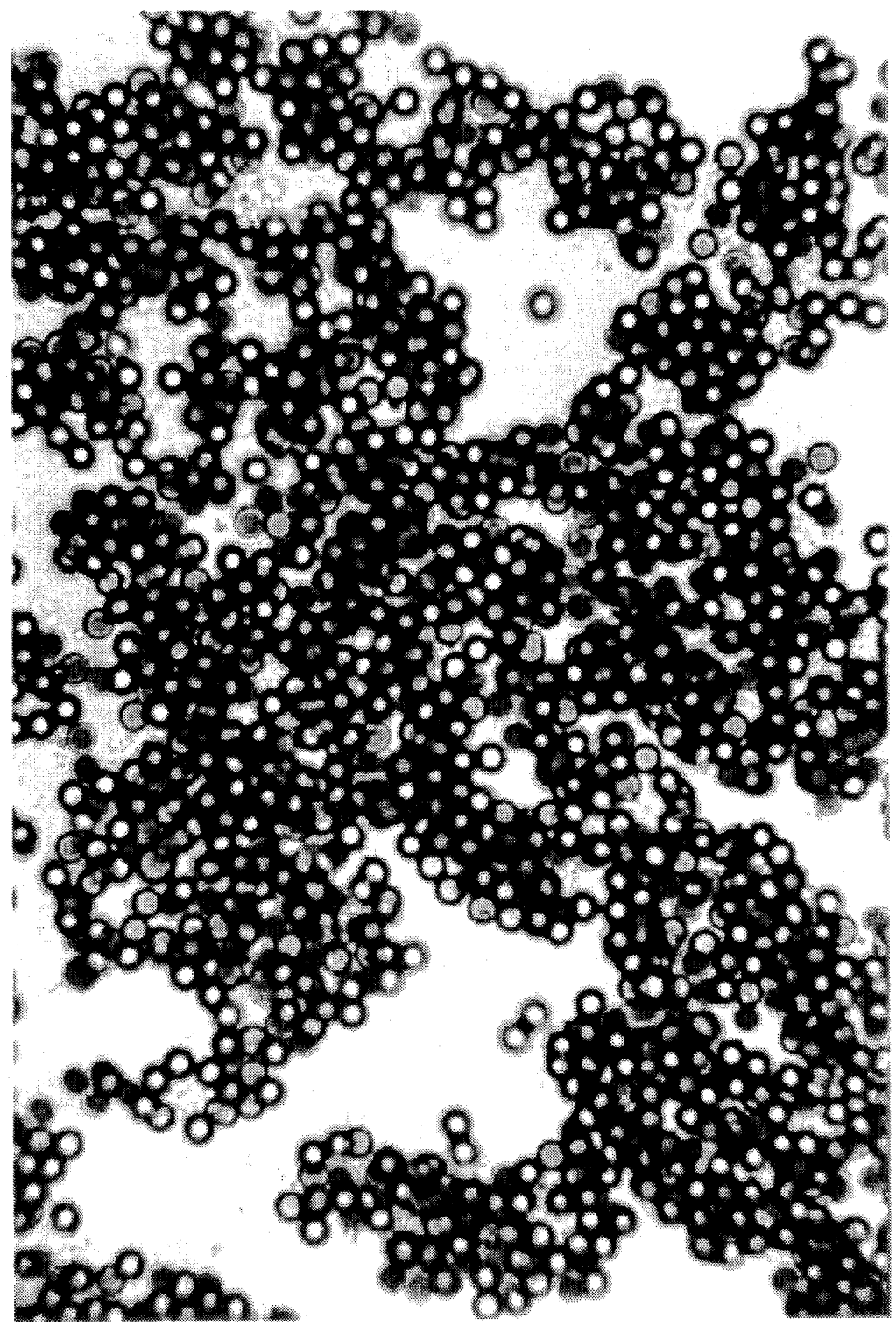
FIG. 9 illustrates aggregation of microspheres marking adhesive masses formed from algal polyphenols and a tenfold higher concentration of vanadate peroxidase in Solution E.

FIG. 3, J shows zygote 23 h old, labeled with amino-modified polystyrene microspheres 2.47 µm in diameter as in FIG. 9, and then treated with citrate. There is loss of all microspheres bound to the rhizoid surface. The scale bar is 20 µm.

FIG. 3, K shows blue polystyrene microspheres 5000 µm in diameter, bound to aggregated material in culture medium previously incubated with zygotes for 30 minutes, at age 1.0–1.5 h. The scale bar is 50 µm.

FIG. 3, L shows blue polystyrene microspheres 5000 µm in diameter, bound to aggregated material in culture medium previously incubated with zygotes for 1 h, at age 3.5–4.5 h. The scale bar is 50 µm.

FIG. 3, M shows blue polystyrene microspheres 5000 µm in diameter on 12 h zygotes, labeling a corona of adhesive material surrounding each zygote. The scale bar is 150 µm.

Figure 4:
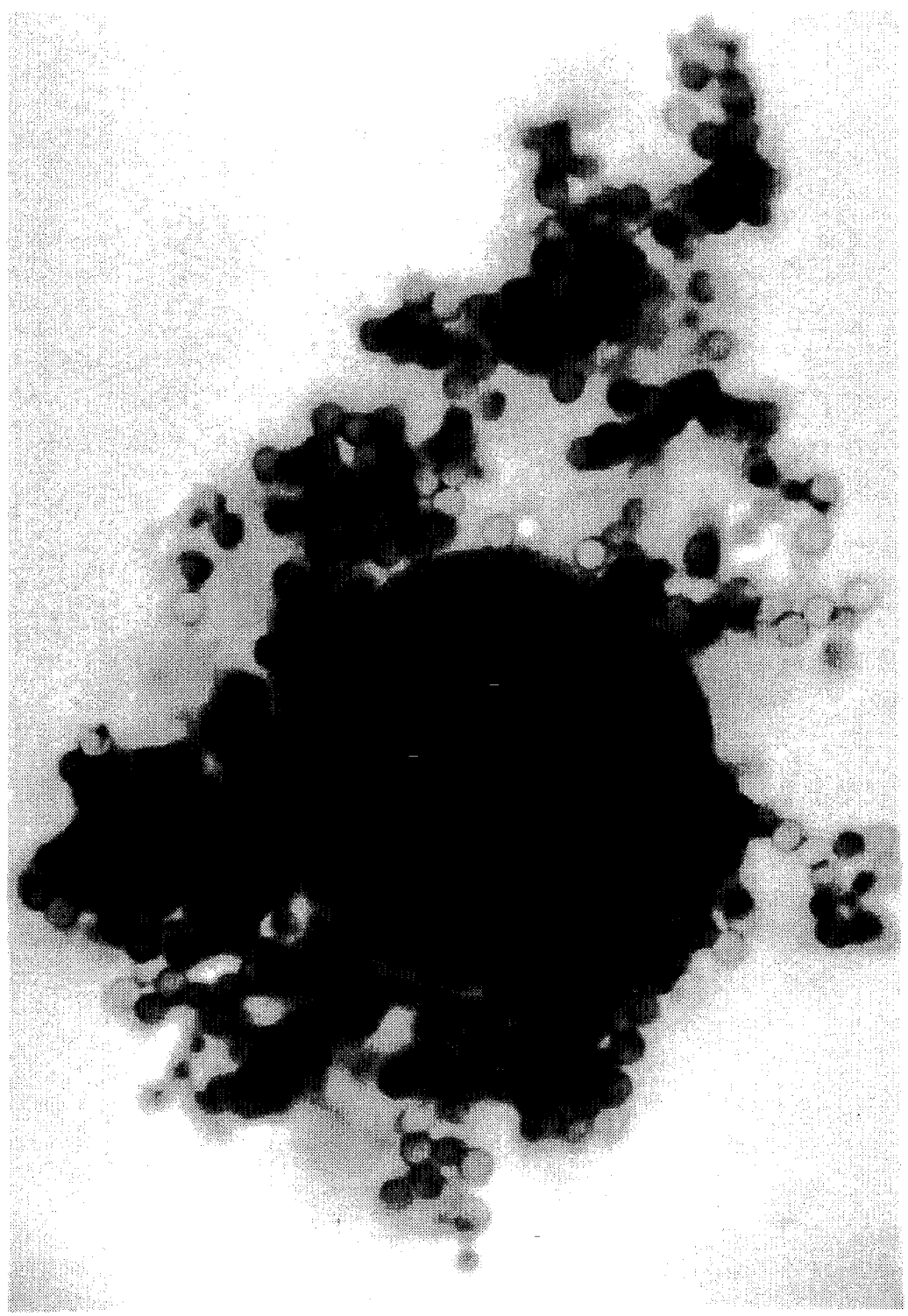
FIG. 4 illustrates enhanced formation of adhesive material by 5 hours zygote of *Fucus gardneri* with added vanadate peroxidase.

FIG. 4 illustrates formation of adhesive material by 5 hours zygote of *Fucus gardneri* grown in artificial seawater containing 12.7 ng/ml of Corallina bromoperoxidase. Non-specific binding of 4.84 um blue microspheres demonstrates that larger masses of adhesive material were formed from materials secreted by the algal cell than produced without added enzyme of FIG. 3.

Figure 5:
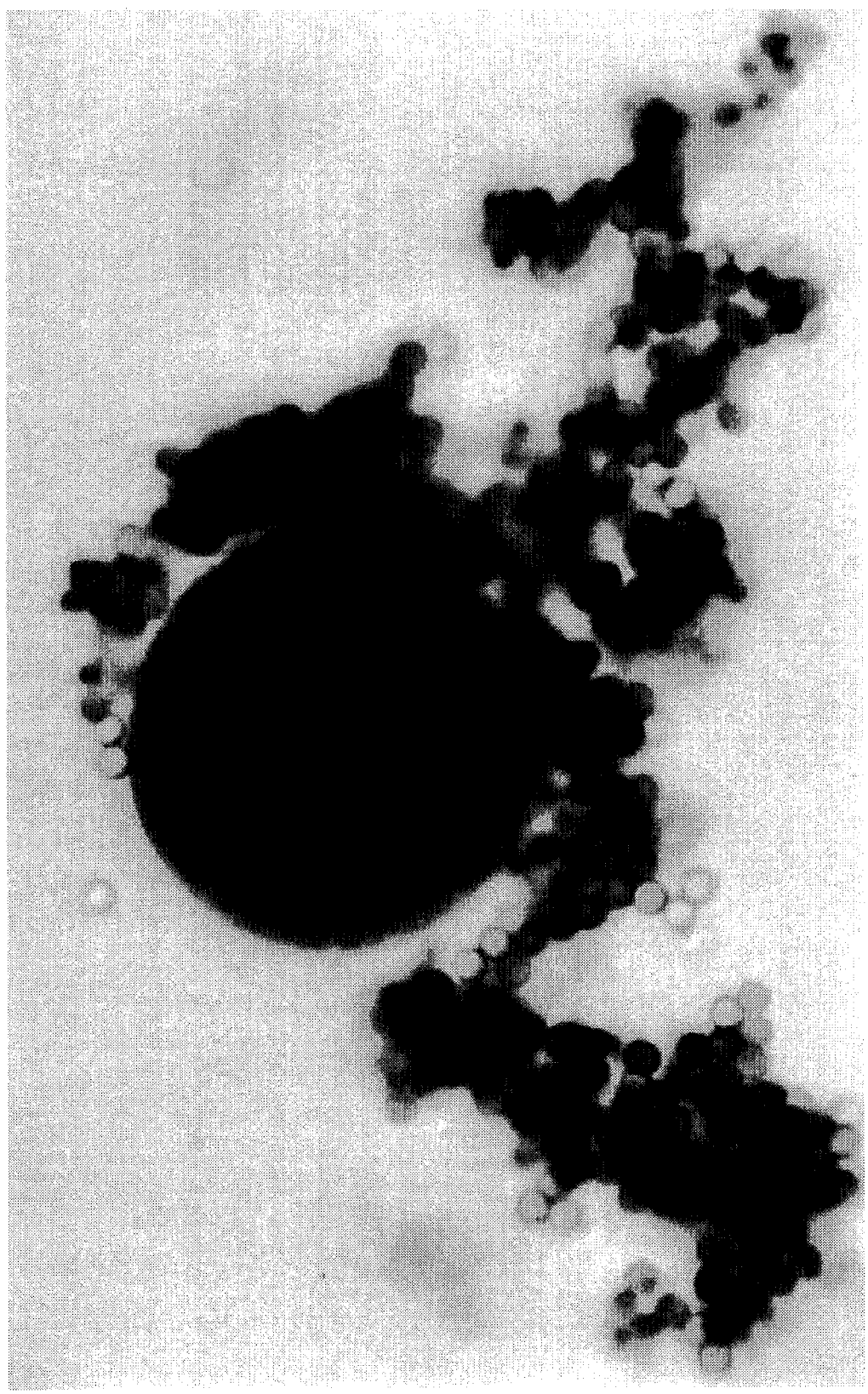
FIG. 5 illustrates enhanced formation of adhesive material by 5 hour zygotes of *Fucus gardneri* with added horseradish peroxidase.

FIG. 5 illustrates formation of adhesive material by 5 hour zygote of *Fucus gardneri* grown in artificial seawater containing 1 μg/ml of horseradish peroxidase. Nonspecific binding of 4.84 μM blue microspheres demonstrates that larger masses of adhesive material were formed from materials secreted by the algal cell than produced without added enzyme in FIG. 3.

Figure 6:
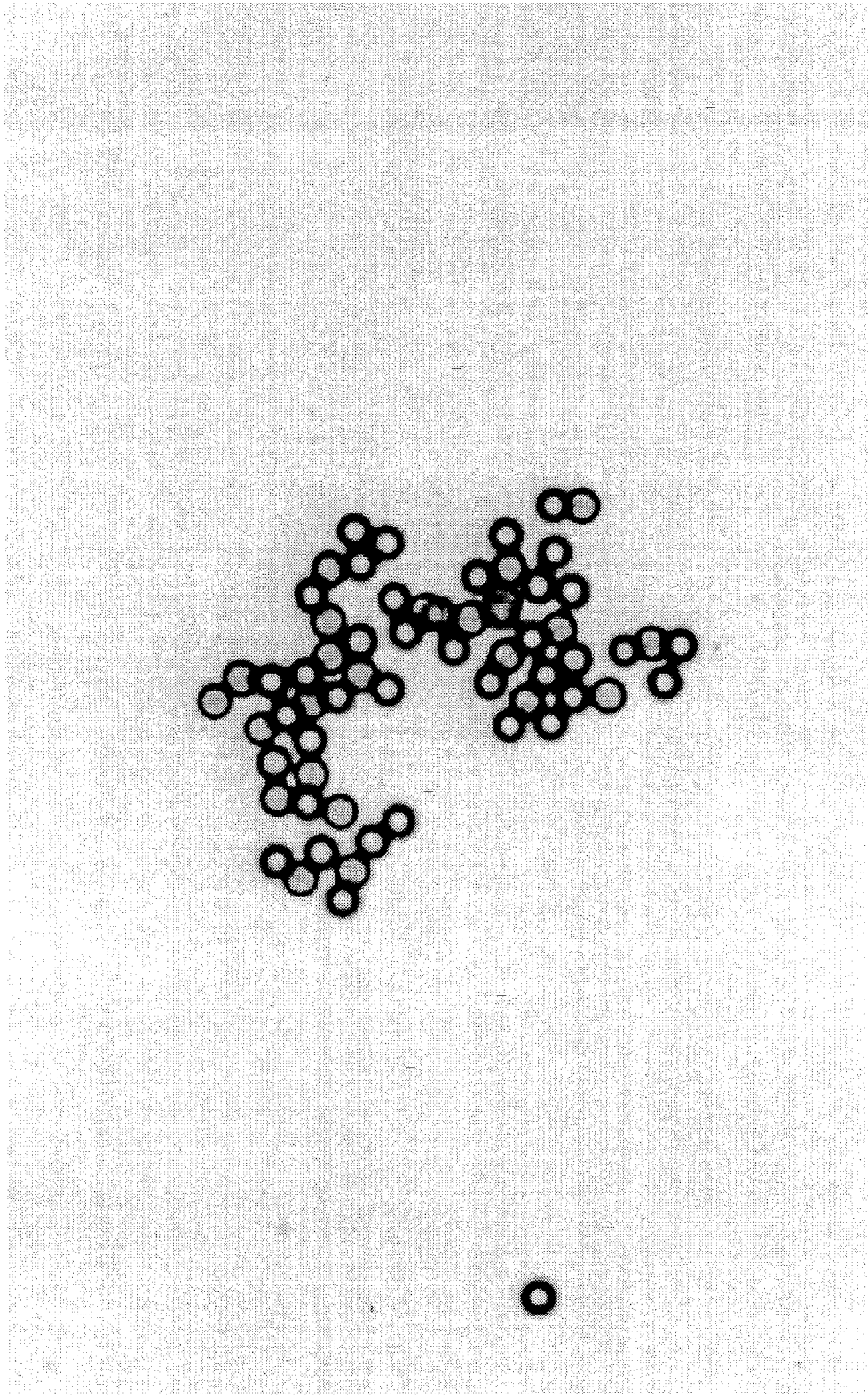
FIG. 6 illustrates aggregation of microspheres marking adhesive masses formed from algal polyphenols and vanadate peroxidase in Solution A.

FIG. 6 illustrates aggregation of microspheres which mark adhesive masses formed from algal polyphenols and vanadate peroxidase in the absence of algal cells and carbohydrate fibers using the composition of Example 2. Aggregates formed are similar to aggregates produced by cells and vanadate peroxidase as in FIG. 4.

Figure 7:
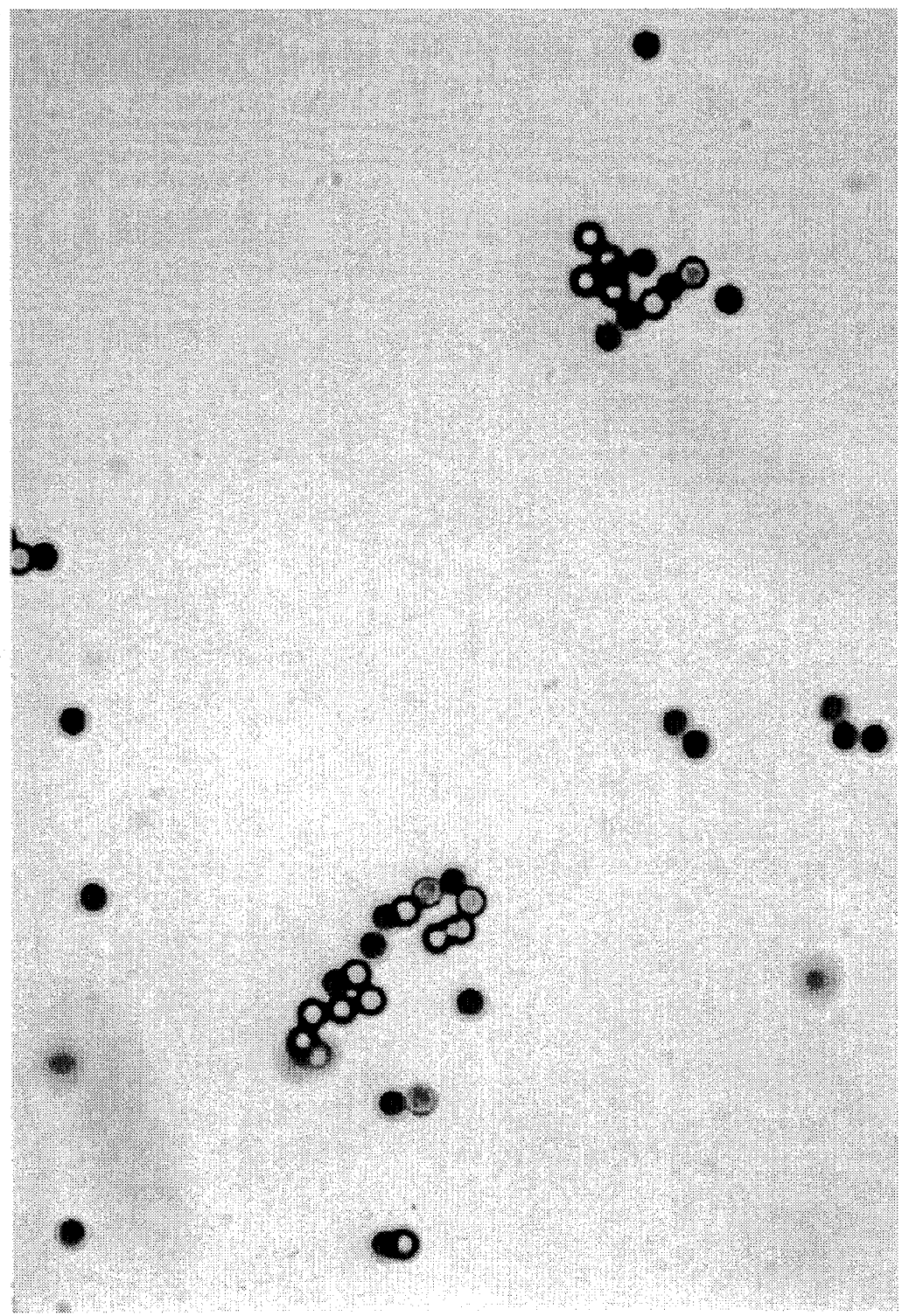
FIG. 7 illustrates aggregation of microspheres marking adhesive masses formed from algal polyphenols, vanadate peroxidase and alginate in Solution H.

FIG. 7 illustrates aggregation of microspheres which mark adhesive masses formed in vitro from algal polyphenols, vanadate peroxidase and alginate in the absence of algal cells using the composition of Example 9. Aggregates formed are smaller than aggregates produced according to FIG. 6.

Figure 8:
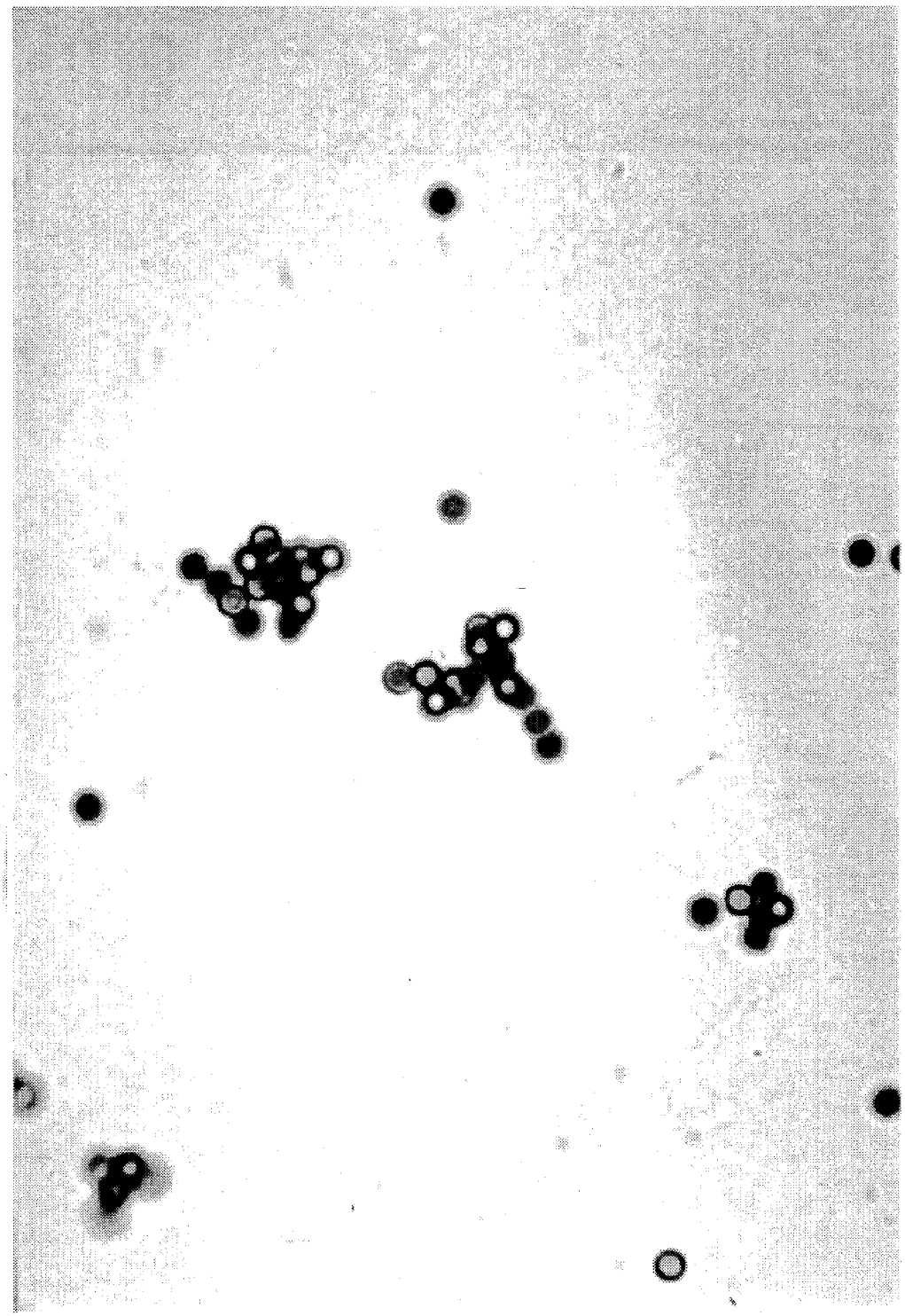
FIG. 8 illustrates aggregation of microspheres marking adhesive masses formed from algal polyphenols, vanadate peroxidase and fucoidan in Solution G.

FIG. 8 illustrates aggregation of microspheres which mark adhesive masses formed in vitro from algal polyphenols, alginate and fucoidan in the absence of algal cells and vanadate peroxidase using the composition of Example 8. Aggregates formed are much smaller than aggregates produced according to FIG. 6.

FIG. 9 illustrates aggregation of microspheres which mark adhesive masses formed in vitro from algal polyphenols and vanadate peroxidase in the absence of algal cells and carbohydrates fibers using the composition of Example 6. Aggregates formed are much larger than aggregates produced according to FIG. 6. Small amounts of polyphenollic material can be seen between some adjacent microspheres.

Figure 10:
FIG. 10 illustrates aggregation of microspheres marking adhesive masses formed from algal polyphenols and sodium hypochlorite in Solution I.

FIG. 10 illustrates aggregation of microspheres which mark adhesive masses formed in vitro from algal polyphenols and Chlorox (sodium hypochlorite) in the absence of algal cells, vanadate peroxidase and carbohydrate fibers using the composition of Example 10. Aggregates formed are much larger than aggregates produced according to FIG. 6 and are denser than aggregates seen in FIG. 9. Considerable polyphenolic material can be seen between some adjacent microspheres.

Figure 11:
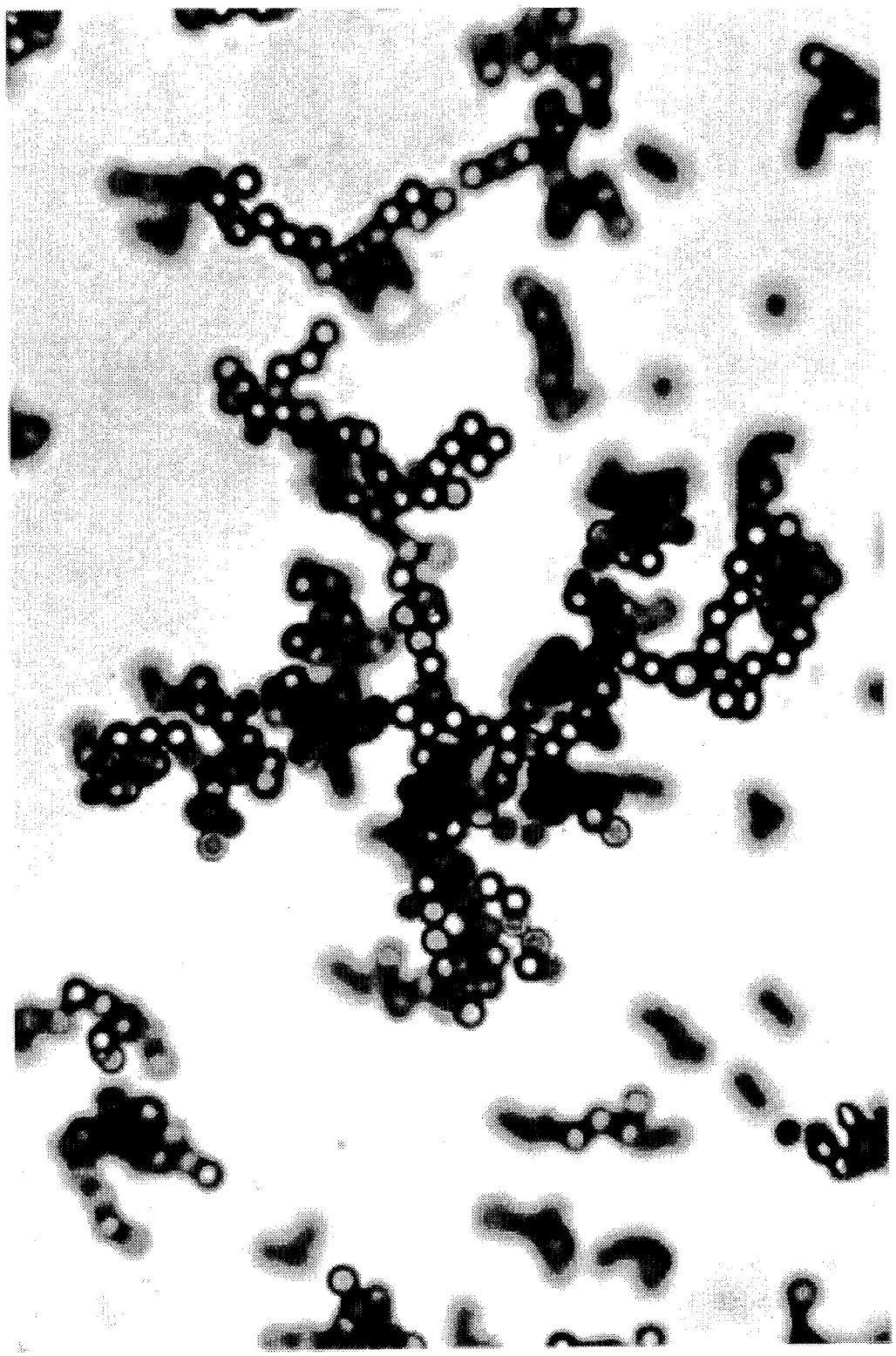
FIG. 11 illustrates aggregation of microspheres marking adhesive masses formed from algal polyphenols and sodium metaperiodate in Solution J.

FIG. 11 illustrates aggregation of microspheres which mark adhesive masses formed in vitro from algal polyphenols and sodium metaperiodate in the absence of algal cells, vanadate peroxidase and carbohydrate fibers using the composition of Example 11. Aggregates formed are very large, branched and filamentous, in contrast to the compact aggregates seen in FIGS. 9 and 10.

UTILITY

The novel type of fiber-phenolic adhesive of this invention comprises novel, naturally-occurring components. The adhesive has different properties than currently available adhesives composed of other materials. The adhesive binds nonspecifically to both hydrophobic and hydrophilic surfaces, and therefore can join substances of different types. For example, polystyrene can be joined to polyethylene or glass. Other applications include textile or printing and use of the adhesive as surface coatings The algal-based type of adhesive has biomedical, marine and other applications because of its ability to form quickly in aqueous solutions. All of the components are major algal products which can be stored in stable form. The carbohydrates and phenolic are inexpensive, an the catalyst is useful in minute quantities. Adhesive mucilage is mostly water and has a very low density. The adhesive provides strength along with flexibility, and can absorb shock such as wave action in the intertidal zone. This system is an adhesive from renewable resources, and important factor in resource utilization and environmental maintenance. This adhesive may be used whenever natural products are desired.

EXAMPLE 1

Production of Phenolic Component

This example illustrates the detection of secretion of adhesive precursors from zygotes of the brown algae, *Fucus gardneri*, and the method used for testing the adhesive properties.

*Fucus gardneri* receptacles were collected at the Berkeley Marina in Alameda County, Duxbury Reef at Bolinas in Marin County and Pidgeon Point in San Mateo County, Calif. Synchronous (±15 minutes) populations of Fucus zygotes were obtained from mature Fucus receptacles by standard methods described in *Handbook of Physiological Methods, Developmental and Cytological Methods*, 60–68 (1980), Cambridge University Press. Zygotes were grown at 15° C. in a simple artificial seawater (ASW) consisting of six salts (Brawley, 1987).

Pieces of reproductive tissue of a brown alga, *Fucus gardneri* were air-dried in an air current. 20 g of the dried plant material was chopped with a razor blade to a size of 2–4 mm. Polyphenols were extracted for 45 minutes in 100 ml of methyl alcohol with stirring. The methyl alcohol extract was filtered on a glass fiber filter. The extract was evaporated to dryness at room temperature with an air current. The dried polyphenols were dissolved in 10 ml of glass-distilled water. The yellow solution was centrifuged at 14 kg for 5 minutes to clarify and stored at −80° C. A concentration of 20–200 mg/ml polyphenols was estimated from literature values of 1–10% polyphenol content.

Adhesive formation was detected by aggregation of blue-colored monodisperse microspheres.

The time of initial adhesion was indicated by clumping of zygotes upon agitation and by zygote adhesion to surfaces of culture vessels. Substrates tested included glass, plastic, teflon and paraffin. Specificity of microsphere binding to adhesive was determined by comparing microsphere binding to the zygote surface before (age 1–2 hours) and after (age 4–6 hours) zygotes adhered to each other and to the substrate.

Monodisperse microspheres 0.044–20 μm in diameter were used to localize adhesive material on zygote surfaces. Microspheres of blue-dyed polystyrene latex (5.000 and 4.840 μm) and blue-dyed carboxylate-modified styrene/vinyl mixed resin (0.044, 0.212, 0.413, 0.951, and 4.8 μm) were obtained from Bangs Laboratories (Carmel, Ind., USA). Undyed amino-modified polystyrene microspheres (2.47 μm) were obtained from Interfacial Dynamics Corporation (Portland, Oreg., USA). Hollow and solid glass microspheres (2–20 μm) were obtained from Polysciences (Warrington, Pa., USA).

The standard microsphere adhesion assay consisted of diluting the microsphere stock solution (4–10% solids) 1:250–400 into artificial seawater, incubating zygotes for 5 minutes with slow shaking on a rotary shaker, and washing twice for 5 minutes in artificial seawater with shaking.

Zygotes 6 hours or younger were incubated with microspheres in 2 ml microcentrifuge tubes, and older zygotes were incubated while attached to glass slides or cover slips. To detect possible dispersion of adhesive around zygotes, highly diluted microspheres were gently added to slides which were then examined undisturbed after addition of a coverslip. For quantitative comparisons, the number of 5 µm diameter blue microspheres attached to each of 30 zygotes was counted for each sample. Exogenous Corallina vanadate peroxidase, horseradish peroxidase and mushroom polyphenol oxidase were added to the artificial seawater in which zygotes were grown in order to detect the effect of these enzymes on generation of adhesiveness. In addition, in vitro studies were performed on the reconstitution of extracted and purchased adhesive components. In these experiments, the formation of adhesive masses was detected by clumping of microspheres.

EXAMPLE 2

Adhesivity of Solution A

This example illustrates the effect of Solution A on aggregation of blue microspheres in the absence of zygotes.

Solution A

10 µl of 4.5M NaCl;

5 µl of 50 mM CDTA in 500 mM KCl;

10 µl of 100 mM tris-sulfate, pH 8.3;

10 µl of Fucus polyphenols;

10 µl of a 1:20 dilution of blue 4.84 µm diameter polystyrene microsphere solution (Bangs Laboratories, Carmel, Ind.) in 100 mM tris-sulfate, pH 8.3;

127 ng of Sigma bromoperoxidase from Corallina officinalis in 10 µl of 100 mM tris-sulfate, pH 8.3;

10 µg of Sigma urea hydrogen peroxide; and

30 µg of KBr in 10 µl of 100 mM tris-sulfate, pH 8.3.

The individual reagents were added in the above order to a 0.5 ml plastic microcentrifuge tube with mixing after each addition. The mixture was incubated at 23° C. overnight. After the incubation, large branched aggregates of more than 14 microspheres were observed with a light microscope, floating at the liquid surface. The reaction mixture turned yellow after a few minutes.

EXAMPLE 3

Adhesivity of Solution B

This example illustrates the effect of Solution B on aggregation of blue microspheres in the absence of zygotes.

Solution B 0.5 mg of Sigma alginic acid from *Macrocystis pyrifera*, low viscosity, in 10 µl water;

10 µl of 4.5M NaCl; 5 µl of 50 mM CDTA in 500 mM KCl;

10 µl of Fucus polyphenols;

10 µl of a 1:20 dilution of blue 4.84 µm diameter polystyrene microsphere solution, in 100 mM tris-sulfate, pH 8.3;

127 ng of Sigma bromoperoxidase protein from *Corallina officinalis* in 10 µl of 100 mM tris-sulfate, pH 8.3;

10 µg of Sigma urea hydrogen peroxide and 30 µg of KBr in 10 µl of 100 mM tris-sulfate, pH 8.3.

The individual reagents were added in the above order to a 0.5 ml plastic microcentrifuge tube with mixing after each addition:

The mixture was incubated overnight at 23° C. After the incubation, branched aggregates of 6–16 microspheres precipitated at the bottom of the liquid as observed with a light microscope. The reaction mixture turned yellow after a few minutes.

EXAMPLE 4

Adhesivity of Solution C

This example illustrates the effect of the composition of Solution C on aggregation of blue microspheres in the absence of zygotes.

Solution C 0.5 mg of Sigma alginic acid from *Macrocystis pyrifera*, low viscosity, in 10 µl water;

0.5 mg of Sigma fucoidan from Fucus in 10 µl water;

10 µl of 4.5M NaCl;

5 µl of 50 mM CDTA in 500 mM KCl;

10 µl of Fucus polyphenols;

10 µl of a 1:20 dilution of blue 4.84 µm diameter polystyrene microsphere solution, in 100 mM tris-sulfate, pH 8.3;

127 ng of Sigma bromoperoxidase protein from *Corallina officinalis* in 10 µl of 100 mM tris-sulfate, pH 8.3;

10 µg of Sigma urea hydrogen peroxide; and

30 µg of KBr in 10 µl of 100 mM tris-sulfate, pH 8.3.

The mixture was incubated overnight at 23° C. After the incubation, branched aggregates of 6–16 microspheres precipitated at the bottom of the liquid as observed with a light microscope. The reaction mixture turned yellow after a few minutes.

EXAMPLE 5

Adhesivity of Solution D

This example illustrates the effect of composition of Solution D on aggregation of blue microspheres in the absence of zygotes.

Solution D

10 µl of 4.5M NaCl;

5 µl of 50 mM CDTA in 500 mM KCl;

10 µl of 100 mM tris-sulfate, pH 8.3;

10 µl of 200 mM Sigma dithiothreitol (Cleland's reagent);

10 µl of Fucus polyphenols;

10 µl of a 1:20 dilution of blue 4.84 µm diameter polystyrene microsphere solution, to 100 mM tris-sulfate, pH 8.3;

127 ng of Sigma bromoperoxidase protein from *Corallina officinalis* in 10 µl of 100 mM tris-sulfate, pH 8.3;

10 µg of Sigma urea hydrogen peroxide and 30 µg of KBr in 10 µl of 100 mM tris-sulfate, pH 8.3.

The individual reagents were added in the above order to a 0.5 ml plastic microcentrifuge tube with mixing at each addition. The mixture was incubated overnight at 23° C. After the incubation, branched aggregates of 6–16 microspheres were observed with a light microscope suspended in liquid. The dithiothreitol reaction mixture did not turn yellow overnight.

EXAMPLE 6

Adhesivity of Solution E

This example illustrates the effect of composition of Solution E on aggregation of blue microspheres in the absence of zygotes.

Solution E

10 µl of 4.5M NaCl;

20 µl of Fucus polyphenols;

10 µl of a 1:20 dilution of blue 4.84 µm diameter polystyrene microsphere solution, into 100 mM tris-sulfate, pH 8.3;

1.27 µg of Sigma bromoperoxidase protein from *Corallina officinalis* in 1 µl of water;

10 µg of Sigma urea hydrogen peroxide and 30 µg of KBr in 10 µl of 100 mM tris-sulfate, pH 8.3:

The individual reagents were added in the above order to a 0.5 ml plastic microcentrifuge tube with mixing after each addition. The mixture was incubated overnight at 23° C. After the incubation, huge sheet-like aggregates were observed with a light microscope, precipitated at the bottom of the liquid. The reaction mixture turned yellow rapidly.

EXAMPLE 7

Adhesivity of Solution F

This example illustrates the effect of composition of Solution F on aggregation of blue microspheres in the absence of zygotes.

Solution F

10 µl of 4.5M NaCl;

20 µl of Fucus polyphenols;

10 µl of a 1:20 dilution of blue 4.84 µm diameter polystyrene microsphere solution, in 100 mM tris-sulfate, pH 8.3;

1.27 µg of Sigma bromoperoxidase protein from *Corallina officinalis* in 1 µl of water;

20 µg of Sigma urea hydrogen peroxide and 60 µg of KBr in 20 µl of 100 mM tris-sulfate, pH 8.3.

The individual reagents were added in the above order to a 0.5 ml plastic microcentrifuge tube with mixing after each addition. The mixture was incubated overnight at 23° C. After the incubation, branched aggregates of more than 20 microspheres precipitated as observed with a light microscope. The reaction mixture turned yellow slowly.

EXAMPLE 8

Adhesivity of Solution G

This example illustrates the effect of composition of Solution G on aggregation of blue microspheres in the absence of zygotes.

Solution G 0.5 mg of Sigma alginic acid from *Macrocystis pyrifera*, low viscosity, in 10 µl water;

0.5 mg of Sigma fucoidan from Fucus sp. in 10 µl water;

10 µl of 4.5M NaCl;

5 µl of 50 mM CDTA in 500 mM KCl;

20 µl of Fucus polyphenols;

10 µl of a 1:20 dilution of blue 4.84 µm diameter polystyrene microsphere solution, in 100 mM tris-sulfate, pH 8.3;

10 µg of Sigma urea hydrogen peroxide and 30 µg of KBr in 10 µl of 100 mM tris-sulfate, pH 8.3.

The individual reagents were added in the above order to a 0.5 ml plastic microcentrifuge tube with mixing after each addition. The mixture was incubated overnight at 23° C. After the incubation, tight aggregates of 4–10 microspheres were observed with a light microscope incubation, suspended in the liquid, and slightly larger aggregates were precipitated at the bottom of the liquid. The reaction mixture turned deep yellow rapidly.

EXAMPLE 9

Adhesivity of Solution H

This example illustrates the effect of the composition of Solution H on aggregation of blue microspheres in the absence of zygotes.

Solution H 0.5 mg of Sigma alginic acid from *Macrocystis pyrifera*, low viscosity, in 10 µl water 10 µl of 4.5M NaCl;

5 µl of 50 mM CDTA in 500 mM KCl;

20 µl of Fucus polyphenols;

10 µl of a 1:20 dilution of blue 4.84 µm diameter polystyrene microsphere solution, in 100 mM tris-sulfate, pH 8.3;

127 ng of Sigma bromoperoxidase protein from *Corallina officinalis* in 10 µl of 100 mM tris-sulfate, pH 8.3;

10 µg of Sigma urea hydrogen peroxide and 30 µg of KBr in 10 µl of 100 mM tris-sulfate, pH 8.3.

The individual reagents were added in the above order to a 0.5 ml plastic microcentrifuge tube with mixing at each addition. The mixture was incubated overnight at 23° C. Branched aggregates of 4–10 microspheres were observed with a light microscope after overnight incubation, precipitated at the bottom of the liquid. The reaction mixture turned yellow slowly.

EXAMPLE 10

Adhesivity of Solution I

This example illustrates the effect of the composition of Solution I on aggregation of blue microspheres in the absence of zygotes.

Solution I

10 µl of 4.5M NaCl;

35 µl of 100 mM tris-sulfate, pH 8.3;

20 µl of Fucus polyphenols;

10 µl of a 1:20 dilution of blue 4.84 µm diameter polystyrene microsphere solution, in water;

10 µl of a 1:70 dilution of Chlorox in water.

The individual reagents were added in the above order to a 0.5 ml plastic microcentrifuge tube with mixing at each addition. The mixture was incubated overnight at 23° C. Huge, solid aggregates of microspheres, with small amounts of yellow material between some adjacent blue microspheres precipitated at the bottom of the liquid as observed with a light microscope after overnight incubation. The reaction mixture turned yellow rapidly.

EXAMPLE 11

Adhesivity of Solution J

This example illustrates the effect of the composition of Solution J on aggregation of blue microspheres in the absence of zygotes.

Solution J

10 μl of 4.5M NaCl;

35 μl of 100 mM tris-sulfate, pH 8.3;

20 μl of Fucus polyphenols;

10 μl of a 1:20 dilution of blue 4.84 um diameter polystyrene microsphere solution, in water.

10 μl of a 10 mM solution of sodium metaperiodate in water.

The individual reagents were added in the above order to a 0.5 ml plastic microcentrifuge tube with mixing at each addition. The mixture was incubated overnight at 23° C. Huge, branched, filamentous aggregates of microspheres precipitated at the bottom of the liquid as observed with a light microscope after overnight incubation. The reaction mixture turned yellow slowly.

What is claimed is:

1. A water-resistant aqueous adhesive comprising natural phenolic compounds extracted from algae.

2. The aqueous adhesive of claim 1 wherein the phenolic compound consists of phloroglucinol units of the formula

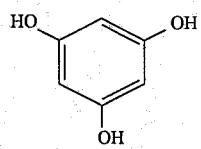

namely, 1,3,5-trihydroxybenzene.

3. The aqueous adhesive of claim 2 wherein the phenolic compound is polyphenol containing from about 2 to 500,000 phloroglucinol units.

4. The aqueous adhesive of claim 3 wherein the phenolic compound is activated in the presence of an oxidizing agent selected from the group consisting of sodium hypochlorite, hydrogen peroxide, urea hydrogen peroxide, periodic acid, nitric acid, potassium permanganate, potassium dichromate, and sodium metaperiodate, organic peroxides, free radical forming agents and sodium orthovanadate.

5. The aqueous adhesive of claim 4 wherein the phenolic compound is extracted from algae in a solution comprising lower alcohol and acetone.

6. A water-resistant aqueous adhesive comprising natural phenolic compounds extracted from algae and activated with a naturally derived enzyme catalyst.

7. The aqueous adhesive of claim 6 wherein the phenolic compound consists of phloroglucinol units of the following formula

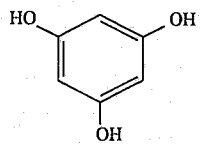

namely 1,3,5-trihydroxybenzene.

8. The aqueous adhesive of claim 7 wherein the phenolic compound is a polyphenol containing from about 2 to 500.000 phloroglucinol units.

9. The aqueous adhesive of claim 8 wherein the naturally derived enzyme catalyst is a vanadate requiring haloperoxidase or a higher plant peroxidase.

10. The aqueous adhesive of claim 9 wherein the enzyme catalyst is an algal derived vanadate-requiring bromoperoxidase or a vanadate-requiring iodoperoxidase.

11. The aqueous adhesive of claim 10 wherein the ratio of vanadate to peroxidase in the algal derived enzyme catalyst is about 0.1:1 to 1:1.

12. The aqueous adhesive of claim 11 wherein the higher plant peroxidase is a horseradish peroxidase.

13. A water-resistant aqueous adhesive comprising activated phenolic compounds extracted from algae, and cross-linked with algal carbohydrate or natural algal fibrous material, or protein materials.

14. The adhesive of claim 13 wherein the phenolic compound is activated in the presence of a naturally derived enzyme catalyst or an oxidizing agent.

15. The adhesive of claim 14 wherein the phenolic compound consists of phloroglucinol units of the following formula

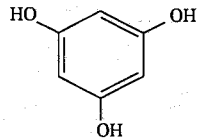

namely, 1,3,5-trihydroxybenzene.

16. The adhesive of claim 15 wherein the naturally derived algal carbohydrate or fibrous material is extracted from brown algae.

17. The adhesive of claim 16 wherein the naturally derived algal carbohydrates or fibrous material is selected from the group consisting of alginates, alginic acid, fucans, and fucoidans.

18. The adhesive of claim 17 wherein the naturally derived enzyme catalyst is a higher plant peroxidase or an algal derived vanadate-requiring haloperoxidase.

19. The adhesive of claim 17 wherein the vanadate-requiring haloperoxidase is a vanadate-requiring bromoperoxidase or a vanadate-requiring iodoperoxidase.

20. The adhesive of claim 15 wherein the oxidizing agent is selected from the group consisting of sodium hypochlorite, hydrogen peroxide, urea hydrogen peroxide, periodic acid, nitric acid, potassium permanganate, potassium dichromate, sodium metaperiodate, organic peroxides, free radical forming agents and sodium orthovanadate.

* * * * *